United States Patent [19]

Anscher

[11] Patent Number: 5,502,878
[45] Date of Patent: Apr. 2, 1996

[54] SWIVELLING SNAPHOOK

[75] Inventor: Joseph Anscher, Muttontown, N.Y.

[73] Assignee: National Molding Corporation, Farmingdale, N.Y.

[21] Appl. No.: 294,681

[22] Filed: Aug. 23, 1994

Related U.S. Application Data

[63] Continuation-in-part of Ser. No. 947,241, Sep. 18, 1992.

[51] Int. Cl.$^6$ ................................................. A44B 13/00
[52] U.S. Cl. ............................ 24/265 H; 24/662; 24/905
[58] Field of Search .......................... 24/265 H, 265 EE, 24/598.5, 905, 615, 616, 324, 662, 297, 136 L, 115 G, 115 L; 411/512, 353

[56] References Cited

U.S. PATENT DOCUMENTS

| | | | |
|---|---|---|---|
| 3,551,963 | 1/1971 | Mosher, Jr. et al. ................ | 24/662 |
| 4,304,403 | 12/1981 | Wilson ............................... | 24/265 H |
| 4,577,374 | 3/1986 | Lii ..................................... | 24/265 H |
| 4,693,248 | 9/1987 | Failla ................................. | 411/512 |
| 4,844,677 | 7/1989 | Schwartzman ..................... | 411/512 |
| 4,868,954 | 9/1989 | Kasai ................................. | 24/265 H |
| 5,127,137 | 7/1992 | Krauss ............................... | 24/265 H |
| 5,146,657 | 9/1992 | Frano ................................ | 24/265 H |

FOREIGN PATENT DOCUMENTS

| | | | |
|---|---|---|---|
| 0925284 | 8/1947 | France ............................... | 24/662 |
| 0223401 | 10/1924 | United Kingdom ................ | 24/265 H |

*Primary Examiner*—Victor N. Sakran
*Attorney, Agent, or Firm*—Kenyon & Kenyon

[57] ABSTRACT

A swivelling snaphook is provided including a retainer rotatably connected with a hook member. The retainer includes a receptacle, two converging bars joined to opposite sides of the receptacle, and a base bar connecting the ends of the converging bars distal to the receptacle. The receptacle includes an internal wall defining an orifice extending through the receptacle. The internal wall includes three resiliently deformable projection segments extending into the orifice. The hook member includes a hook body and an insertion member for insertion into the orifice of the receptacle.

33 Claims, 7 Drawing Sheets

SWIVELLING SNAPHOOK

RELATED APPLICATION

This application is a continuation-in-part of co-pending application Ser. No. 07/947,241, which was filed on Sep. 18, 1992.

TECHNICAL FIELD OF THE INVENTION

This invention relates generally to hooks and more particularly to snaphooks.

BACKGROUND OF THE INVENTION

Swivelling snaphooks generally comprise a hook member rotatably connected with a retainer that is adapted to receive a strap or some type of carrying member. In one prior art design, the retainer includes a shank with an enlarged portion and the hook member includes a receptacle with a slot formed therein. The receptacle is adapted to receive the shank and the enlarged portion. One problem with this design is that when force is applied to the hook member during use, the receptacle may split open at the slot, causing the shank to be released.

Accordingly, one object of this invention is to provide an assembled swivelling snaphook comprising a hook member and a retainer that will withstand separation when loads are applied to the snaphook during use.

Another object of this invention is to provide a swivelling snaphook comprising a hook member and a retainer that can easily and securely be assembled.

SUMMARY OF THE INVENTION

A swivelling snaphook is provided including a retainer rotatably connected with a hook member. The retainer includes a receptacle, two converging bars joined to opposite sides of the receptacle, and a base bar connecting the ends of the converging bars distal to the receptacle. The receptacle includes an internal wall defining an orifice extending through the receptacle. The internal wall includes three resiliently deformable projection segments extending into the orifice. The hook member includes a hook body and an insertion member for insertion into the orifice of the receptacle.

The snaphook in accordance with the invention can be easily and securely assembled. In addition, it has been found that the internal projection configuration of the receptacle provides a structurally secure receptacle design capable of maintaining the coupling of the hook member and the retainer even under extreme loads.

DETAILED DESCRIPTION

Figure 1:
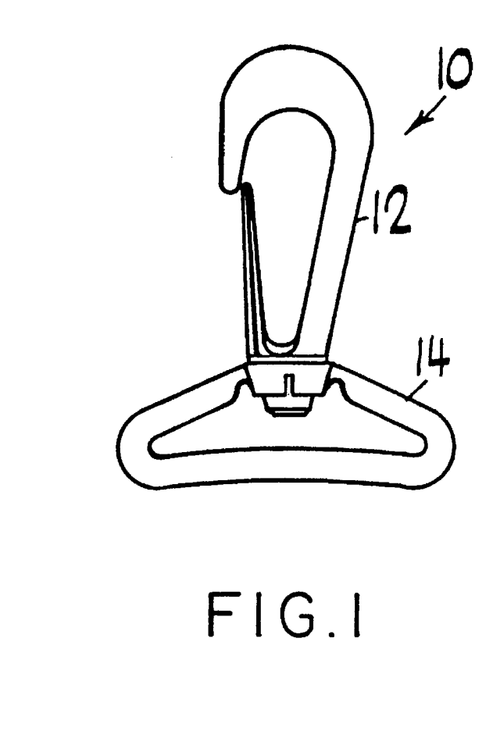
FIG. 1 is a front view of a swivelling snaphook in accordance with one embodiment of the invention.

FIG. 1 illustrates a swivelling snap hook 10 in accordance with one embodiment of the invention. The swivelling snaphook 10 generally comprises a hook member 12 that is rotatably connected with a retainer 14, which is adapted to receive a strap or some type of a carrying member (not shown).

The hook member 12 and the retainer 14 are formed separately and then assembled to form the swivelling snaphook 10. They are preferably formed of molded plastic.

Figure 2:
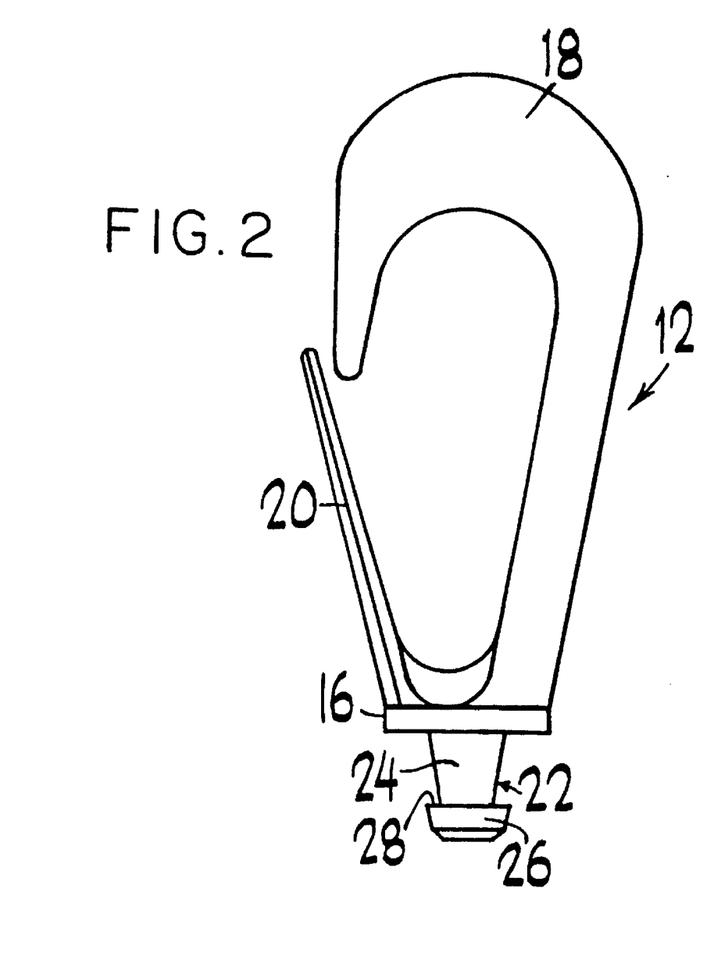
FIG. 2 is an enlarged view of a hook member that forms part of the swivelling snaphook shown in FIG. 1.

FIG. 2 is an enlarged view of the hook member 12 forming part of the snaphook 10 shown in FIG. 1. The hook member 12 includes a base 16, from one side of which extends an open hook body 18 and a resiliently deformable closure tongue 20. The closure tongue 20 is biased toward the hook body 18 to enable the hook body 18 to be closed. Extending from the opposite side of the base 16 is an insertion member 22 adapted for engagement with the retainer 14. The insertion member 22 comprises a shank 24 connected with an enlarged portion 26 having a cammed surface at its leading edge to facilitate insertion into the retainer 14. Both the shank 24 and the enlarged portion 26 may be tapered to facilitate insertion into the retainer 14. The enlarged portion 26 includes a rear shoulder 28 adjacent the shank 24.

Figure 3:
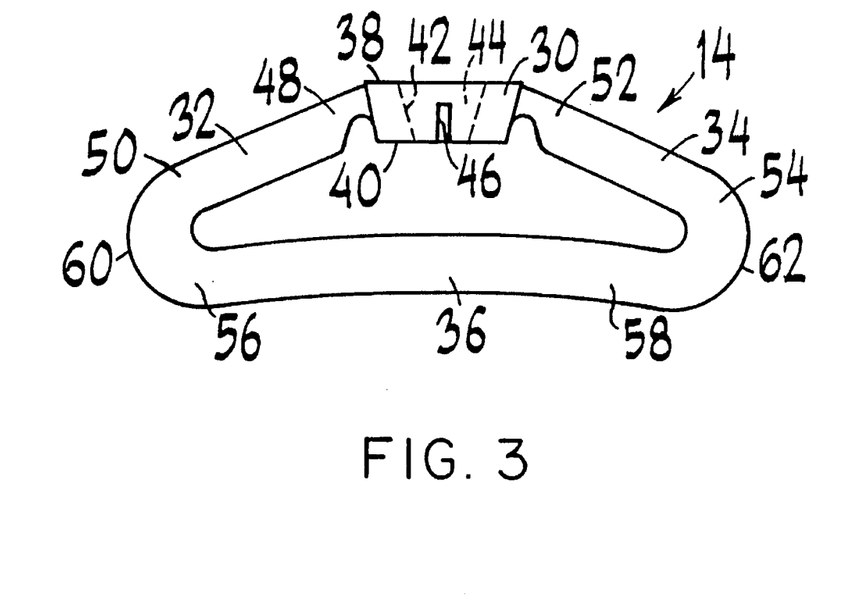
FIG. 3 is an enlarged view of a retainer that also forms part of the swivelling snaphook shown in FIG. 1.

FIG. 3 is an enlarged view of the retainer 14 forming part of the snaphook 10 shown in FIG. 1. The retainer 14 includes a receptacle 30, a pair of converging bars 32 and 34, and a base bar 36. The receptacle 30 includes upper and lower surfaces 38 and 40. The receptacle 30 also includes a sloped annular internal wall 42 defining a tapered orifice 44 extending through the receptacle 30. The receptacle 30 also includes at least one slit 46 or weakened portion formed therein, extending from its lower surface 40 toward its upper surface 38. The slit 46 enables expansion of the orifice 44 during assembly with the hook member 12 as will be described in further detail with reference to FIGS. 5a–5c.

The shank 24 and the internal wall 42 of the receptacle 30 may be congruently shaped and sized to provide a rotatable engagement therebetween that is both axially and radially stable.

The converging bar 32 includes opposite ends 48 and 50, and the converging bar 34 includes opposite ends 52 and 54. The base bar 36, which is slightly curved, includes opposing ends 56 and 58. The ends 48 and 52 of the converging bars 32 and 34, respectively, are formed integrally with or joined to the receptacle 30. The end 50 of the converging bar 32 is formed integrally with or joined to the end 56 of the base bar 36, forming a rounded corner 60. Similarly, the end 54 of the converging bar 34 is formed integrally with or joined to the end 58 of the base bar 36, forming a rounded corner 62. The converging bars 32 and 34 thereby converge toward the receptacle 30 from the opposing ends of the base bar 36.

Figure 4A:
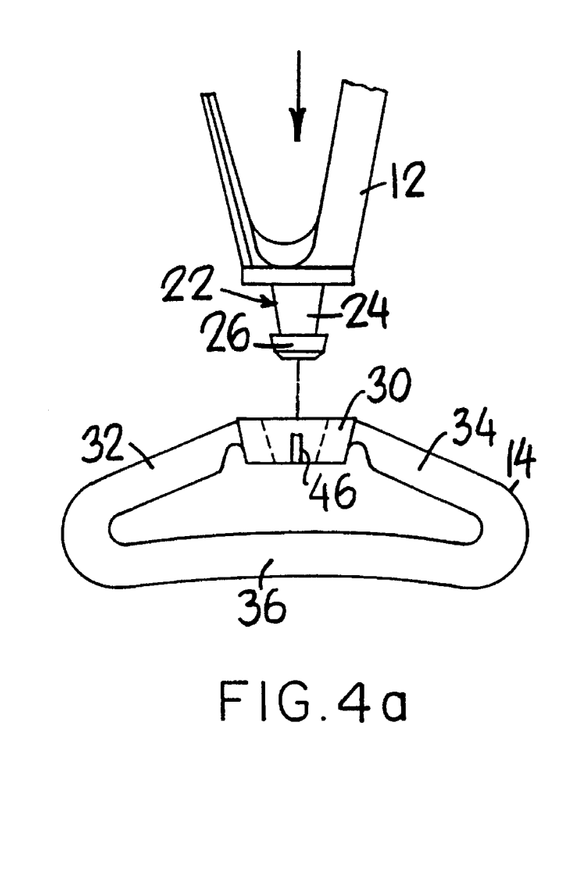
FIGS. 4a–4c are front views of the retainer shown in FIG. 3, illustrating its deformation during assembly with the hook member.
Figure 4B:
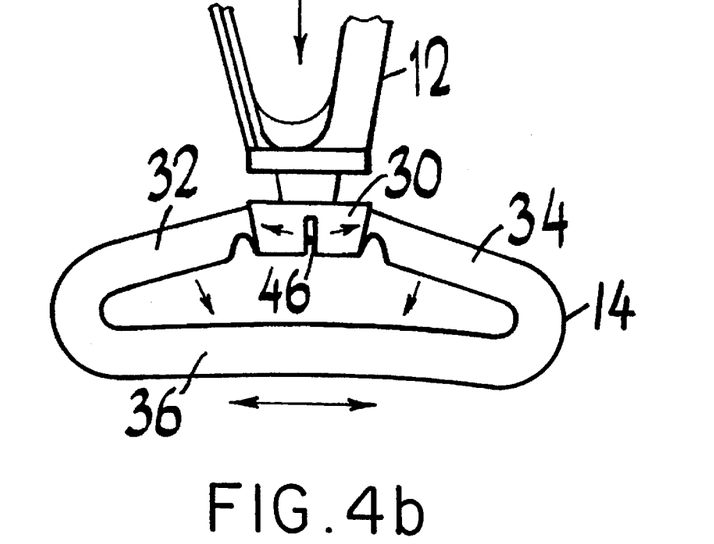
Figure 4C:
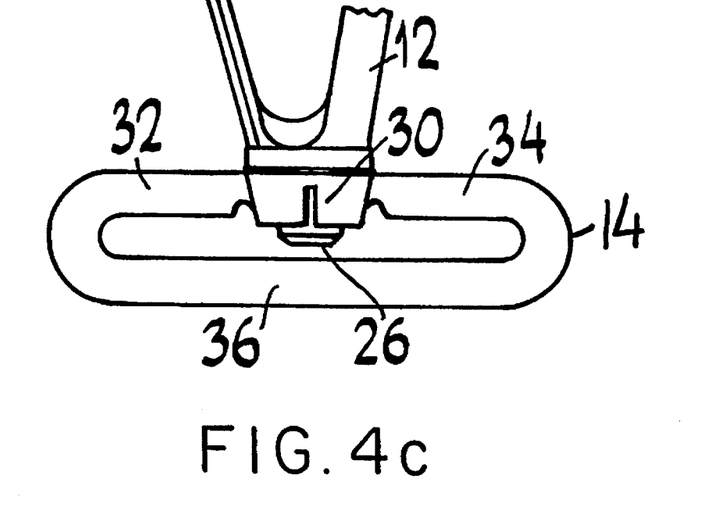

FIGS. 4a–4c illustrate the resilient deformation of the retainer 14 during assembly with the hook member 12. The retainer 14 is placed in a fixture or holding device (not shown) and the insertion member 22 of the hook member 12 is pressed into the receptacle 30. As shown in figures 4b and 4c, as the enlarged portion 26 of the insertion member 22 is forced in the receptacle 30, the receptacle 30 moves slightly downward toward the base bar 36. Also, the base bar 36, which is slightly curved when it is not under stress, becomes generally straight. In addition, the converging bars 32 and 34 are driven downward and become generally horizontal. The hook member 12 continues to be pressed into the retainer 14 until the enlarged portion 26 clears the lower surface 40 of the receptacle 30. At this point, the converging bars 32 and 34 apply an upward force against the hook member 12 to ensure that the enlarged portion 26 has properly cleared the orifice 44, enabling it to be securely locked in the receptacle 30.

Figure 5A:
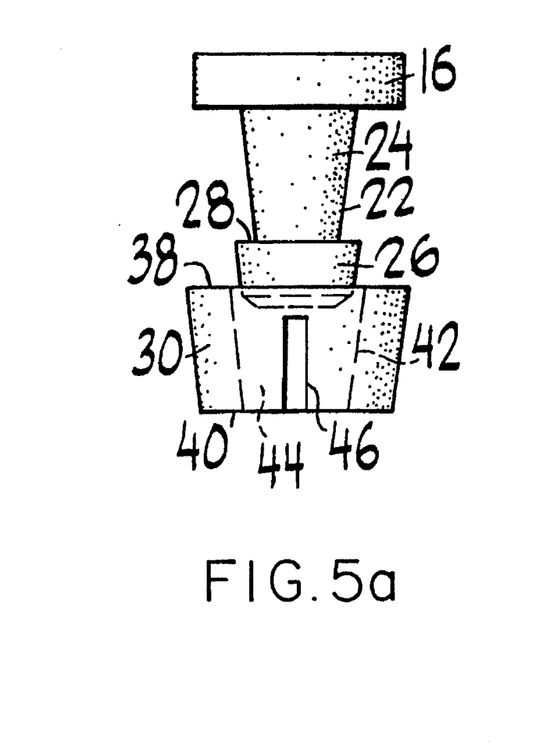
FIGS. 5a–5c are enlarged views of a receptacle forming part the retainer shown in FIG. 3, illustrating its deformation during assembly with the hook member.
Figure 5B:
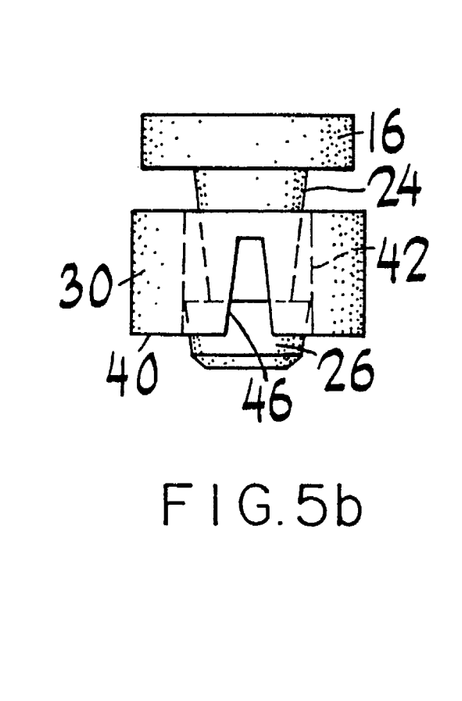
Figure 5C:
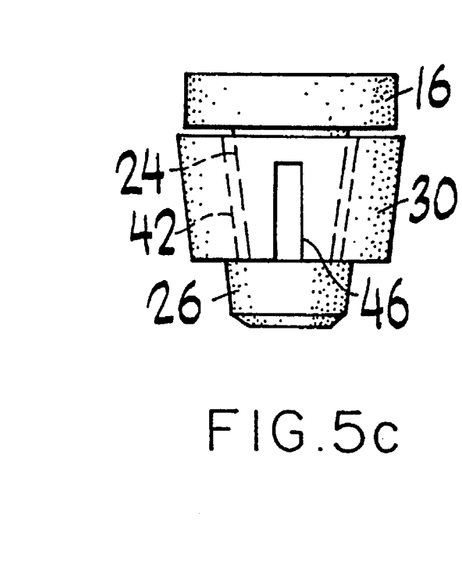

FIGS. 5a–5c illustrate the resilient deformation of the receptacle 30 during the assembly process. As shown in the figures, as the enlarged portion 26 is forced into the orifice 44 in the receptacle 30, the slit 46 opens and the sloped internal wall 42 defining the orifice 44 becomes generally vertical, thereby allowing the enlarged portion 26 to pass through. As the rear shoulder 28 of the enlarged portion 26 clears the lower surface 40 of the receptacle 30, the internal wall 42 returns to its normal sloped position, securely locking the shank 24 and enlarged portion 26 in place as shown in FIG. 5c.

Thus, one advantage of the snaphook 10 is that it can be easily and securely assembled. Another advantage of the snaphook 10 is that when a load is applied to the snaphook during use, the receptacle is designed to close in on and squeeze the shank of the insertion member, thereby inhibiting separation of the parts.

Figure 6:
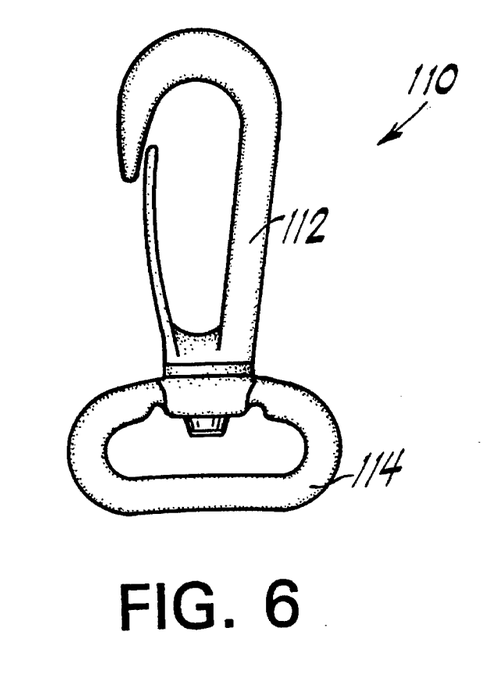
FIG. 6 is a front view of a swivelling snaphook in accordance with another embodiment of the invention.

FIG. 6 illustrates a swivelling snap hook 110 in accordance with another embodiment of the invention. The swivelling snaphook 110 generally comprises a hook member 112 that is rotatably connected with a retainer 114, which is adapted to receive a strap or some type of a carrying member (not shown).

The hook member 112 and the retainer 114 are formed separately and then assembled to form the swivelling snaphook 110. They are preferably formed of molded plastic like the parts of the previously described snaphook 10 of FIG. 1.

Figure 7:
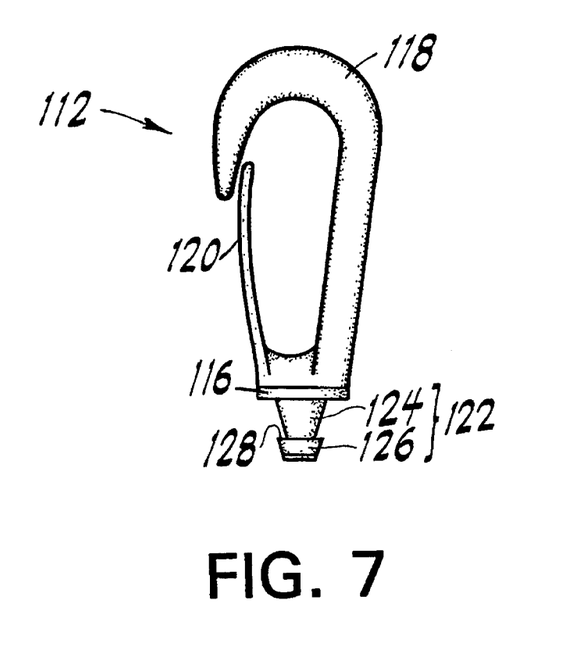
FIG. 7 is a front view of a hook member that forms part of the swivelling snaphook shown in FIG. 6.
Figure 8:
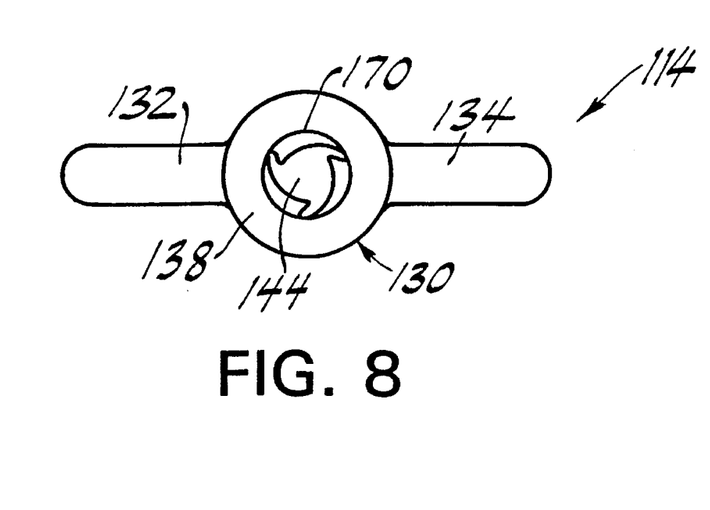
FIG. 8 is a top view of a retainer that forms part of the swivelling snaphook shown in FIG. 6.

FIG. 7 is a side view of the hook member 112 forming part of the snaphook 110 shown in FIG. 6. The hook member 112 is similar in structure to the previously described hook member 12 of FIG. 2. The hook member 112 includes a base 116, from one side of which extends an open hook body 118 and a resiliently deformable closure tongue 120. The closure tongue 120 is biased toward the hook body 118 to enable the hook body 118 to be closed. Extending from the opposite side of the base 116 is an insertion member 122 adapted for engagement with the retainer 114. The insertion member 122 comprises a shank 124 connected with an enlarged portion 126 having a cammed surface at its leading edge to facilitate insertion into the retainer 114. Both the shank 124 and the enlarged portion 126 may be tapered to facilitate insertion into the retainer 114. The enlarged portion 126 includes a rear shoulder 128 adjacent the shank 124.

FIGS. 8–11 are top, front, bottom and cross-section views, respectively, of the retainer 114 forming part of the snaphook 110 shown in FIG. 6. The retainer 114 includes a receptacle 130, a pair of converging bars 132 and 134, and a base bar 136.

Figure 9:
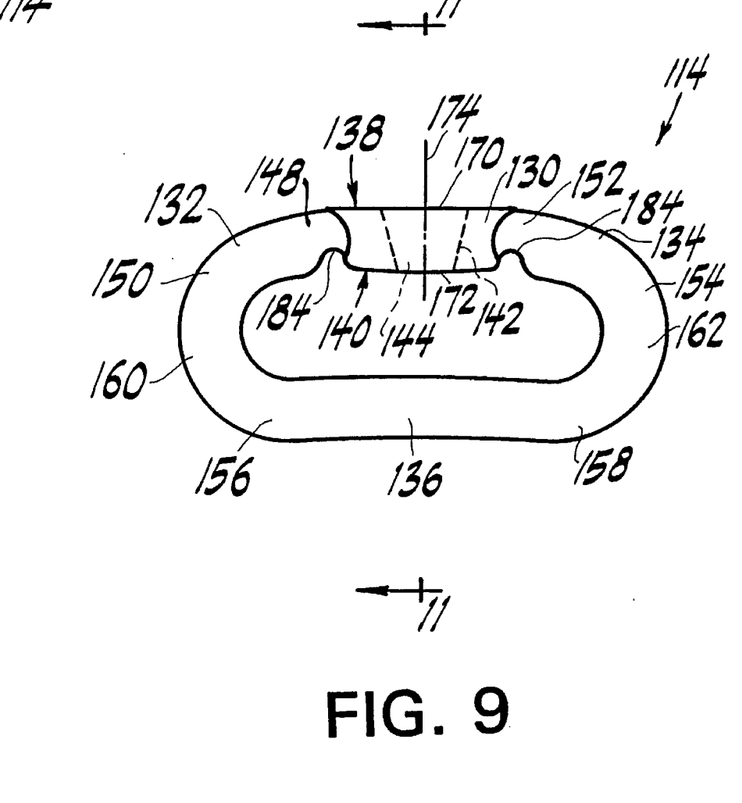
FIG. 9 is a front view of the retainer.
Figure 10:
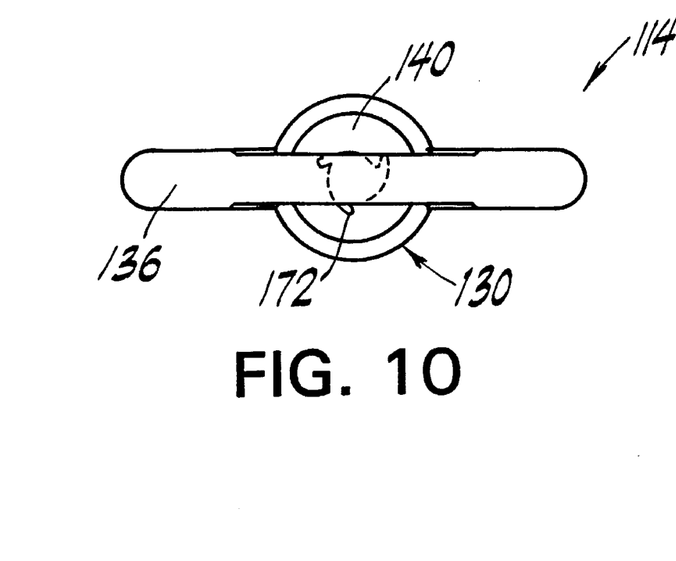
FIG. 10 is a bottom view of the retainer.

As shown in FIG. 9, the converging bar 132 includes opposite ends 148 and 150, and the converging bar 134 includes opposite ends 152 and 154. The base bar 136, which is slightly curved, includes opposing ends 156 and 158. The ends 148 and 152 of the converging bars 132 and 134, respectively, are formed integrally with or joined to the receptacle 130. The end 150 of the converging bar 132 is formed integrally with or joined to the end 156 of the base bar 136 at a rounded corner 160. Similarly, the end 154 of the converging bar 134 is formed integrally with or joined to the end 158 of the base bar 136 at a rounded corner 162. The converging bars 132 and 134 thereby converge toward the receptacle 130 from the opposing ends of the base bar 136.

The receptacle 130 includes opposite top and bottom surfaces 138 and 140. The receptacle 130 also includes an internal wall 142 defining an orifice 144 that extends through the receptacle 130. The top surface 138 of the receptacle includes a top opening 170 leading the orifice 144. Similarly, the bottom surface 140 of the receptacle includes a bottom opening 172 leading to the orifice 144. The orifice 144 includes a central axis 174 extending from the top opening 170 to the bottom opening 172 along the geometric center of the orifice.

Figure 12:
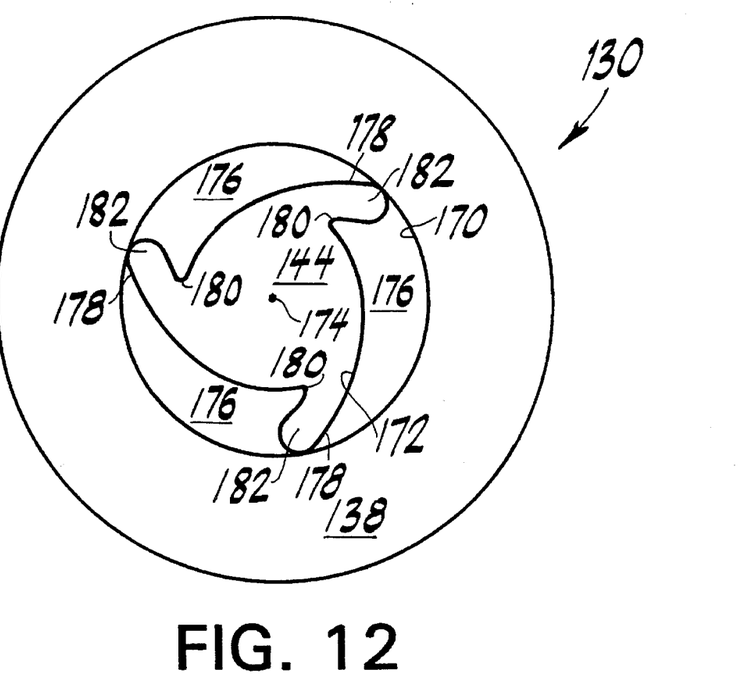
FIG. 12 is an enlarged top view of a receptacle that forms part of the retainer.

The size and shape of the orifice 144 progressively changes from the top opening 170 to the bottom opening 172. As shown in FIG. 12, which is an enlarged top view of the receptacle, the top opening 170 has circular shape and the bottom opening 172 has a smaller triskelion-type shape. Thus, a series of horizontal sectional views (not shown) of the orifice taken perpendicular the central axis 174 of the orifice from the top opening 170 to the bottom opening 172 would show a circle gradually changing into the triskelion-type shape shown in the drawings.

The internal wall 142 defining the orifice 144 generally comprises three resiliently deformable projection segments 176 extending into the orifice as shown in FIG. 12. Each projection segment 176 extends from a flattened end 178 to a peak projection end 180, which is nearer to the central axis 174 than the flattened end. The projection segments 176 are arranged adjacent one another in a circular pattern in the receptacle with the peak projection end 180 of each segment 176 being proximate a flattened end 178 of an adjacent segment 176 with a small gap 182 therebetween.

Figure 11:
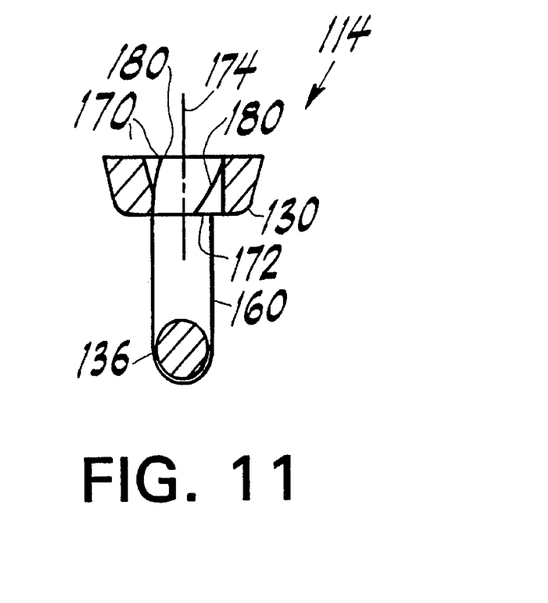
FIG. 11 is a cross-section view of the retainer taken generally along lines 11—11 of FIG. 9.

The projection segments 176 are also arranged in a slight helical pattern about the central axis 174 as is apparent from FIG. 11.

Unlike the receptacle 30 of the FIG. 1 snaphook embodiment, the receptacle 130 does not include a slit extending through the internal wall 142 of the receptacle.

The snaphook 110 can be assembled by inserting the enlarged portion 126 of the hook member 112 into the orifice 144 of the receptacle in a manner similar to the previously described assembly of the snaphook 10.

The top opening 170 of the orifice 144 is larger than the enlarged portion 126, allowing the enlarged portion to freely pass through the opening. The bottom triskelion-shaped opening 172 however defines a relatively small opening through which the enlarged portion 126 cannot freely pass.

During assembly, the retainer 114 is initially held in a fixture or holding device (not shown). The enlarged portion 126 of the hook member 112 is then inserted through the top opening 170 into the orifice 144. As the enlarged portion 126 pressed downwardly toward the bottom opening 172, it engages and is pressed against the projection segments 176, which progressively project further into the orifice. The peak portions 180 of the segments are resiliently moved into the gaps 182 towards proximate flattened portions 178 of adjacent segments. The central portion of the triskelion-shape orifice is thereby enlarged, enabling the enlarged portion 126 to pass through the bottom opening 172 of the orifice. When the shoulder 128 of the enlarged portion 126 passes through the bottom opening 172, the peak portions 180 of each projection segment 174 resiliently return to their original unstressed position about the relatively narrow shank 124 of the hook member 112. The enlarged portion 126 of the hook member 112 is prevented from movement in the opposite direction by the repositioned peak portions 180. The hook member 112 is thereby securely retained in the receptacle.

During assembly, the bar members of the retainer 114 deform resiliently in a manner similar to those of the retainer 14 previously described with reference to FIGS. 4a–4c. As the enlarged portion 126 of the insertion member 122 is forced in the receptacle 130, the receptacle 130 will move slightly downward toward the base bar 136. (A pair of notches 184 are provided in the converging bars 132, 134 proximate the receptacle 130 to facilitate resilient movement of the receptacle 130 relative to the base bar 136.) Also, the base bar 136, which is slightly curved when it is not under stress, will become substantially straight. In addition, the converging bars 132 and 134 will be driven downward and become generally horizontal. The hook member 112 is continuously pressed into the retainer 114 until the enlarged portion 126 clears the bottom opening 172 of the orifice. At this point, the converging bars 132 and 134 will apply an upward force against the hook member 112 to ensure that the enlarged portion 126 has properly cleared the orifice 144, thereby enabling it to be securely locked in the receptacle 130.

The snaphook 110 can thus be easily and securely assembled. In addition, it has been found that the internal projection configuration of the receptacle provides a structurally secure receptacle design capable of maintaining the coupling of the hook member and the retainer even under extreme loads.

Although the present invention has been described with respect to specific embodiments, various changes and modifications may be suggested to one skilled in the art. The present invention is intended to encompass such changes and modifications as fall within the scope of the appended claims.

I claim:

1. A snaphook comprising a hook member and a retainer, wherein one of said hook member and said retainer comprises an insertion member and the other of said hook member and said retainer comprises a receptacle, said receptacle including an internal wall defining an orifice extending through said receptacle for receiving said insertion member, said internal wall comprising at least one resiliently deformable projection segment extending into said orifice, said insertion member comprising a shank and an enlarged end portion wherein said shank is rotatably positioned in said orifice and said projection segment is engageable with said enlarged end portion to inhibit separation of the insertion member and the receptacle.

2. The snaphook of claim 1, wherein said hook member comprises said insertion member and said retainer comprises said receptacle.

3. The snaphook of claim 1, wherein said receptacle includes opposite top and bottom surfaces comprising top and bottom openings, respectively, leading to said orifice.

4. The snaphook of claim 3, wherein said top opening has a generally circular shape and said bottom opening has a generally triskelion-type shape.

5. The snaphook of claim 3, wherein said enlarged portion of said insertion member is configured to pass freely through said top opening, but not freely through said bottom opening.

6. The snaphook of claim 3, wherein the orifice is generally tapered and decreases in size from the top opening to the bottom opening.

7. The snaphook of claim 1, wherein said resiliently deformable projection segment includes a flattened portion and a peak projection portion.

8. The snaphook of claim 1, wherein said projection segment is arranged in a generally helical configuration on said internal wall.

9. The snaphook of claim 1, wherein said internal wall comprises three resiliently deformable projection segments.

10. The snaphook of claim 9, wherein each said projection segment includes a flattened portion and a peak projection portion, wherein the orifice includes a central axis therethrough extending along the geometric center of said orifice, and wherein the distance between the peak portion and the central axis of the orifice is less than the distance between the flattened portion and the central axis, said projection segments each being arranged adjacent another segment such that the peak portion of one segment is proximate the flattened portion of an adjacent segment.

11. The snaphook of claim 1, wherein said hook member and said retainer each comprise molded plastic.

12. The snaphook of claim 1, wherein said resiliently deformable projection segment is in a generally unstressed state when said shank is rotatably positioned in said orifice.

13. The snaphook of claim 1, wherein said shank is tapered.

14. The snaphook of claim 1, wherein said hook member comprises said insertion member and said retainer comprises said receptacle, and wherein said retainer includes two converging members, each connected to said receptacle at generally opposite sides of said receptacle.

15. The snaphook of claim 14, wherein said retainer further comprises a base bar connected to ends of said converging members distal said receptacle.

16. The snaphook of claim 15, wherein said base bar is curved to enable resilient deformation thereof during assembly of said retainer and said hook member.

17. A swivelling snaphook, comprising:

a retainer including a receptacle, a base bar with opposing ends, and two converging bars having opposite ends with one of said opposite ends of each converging bar being joined to said receptacle and the other of said opposite ends being joined to a different one of said opposing ends of said base bar, said receptacle including an internal wall defining an orifice extending through said receptacle, said internal wall comprising at least one resiliently deformable projection member extending into said orifice; and a hook member including a hook body and an insertion member for insertion in said orifice of said receptacle, said insertion member comprising a shank and an enlarged end portion, wherein said shank is rotatably mounted in said orifice and said enlarged end portion is inhibited from movement through said orifice by said protection member.

18. The swivelling snaphook of claim 17, wherein said resiliently deformable projection member is in a generally unstressed state when said shank is rotatably mounted in said orifice.

19. The swivelling snaphook of claim 17, wherein said shank and said enlarged portion are tapered.

20. The swivelling snaphook of claim 17, wherein said base bar is curved to enable resilient deformation thereof during assembly of said retainer and said hook member.

21. The swivelling snaphook of claim 17, wherein said hook member and said receptacle comprise molded plastic.

22. The swivelling snaphook of claim 17, wherein said base bar is joined to said converging bars at a pair of rounded corners.

23. The swivelling snaphook of claim 17, wherein said receptacle includes opposite top and bottom surfaces comprising top and bottom openings, respectively, leading to said orifice.

24. The swivelling snaphook of claim 23, wherein said top opening has a generally circular shape and said bottom opening has a generally triskelion-type shape.

25. The swivelling snaphook of claim 23, wherein said enlarged portion is configured to pass freely through said top opening, but not freely through said bottom opening.

26. The swivelling snaphook of claim 23, wherein the orifice is generally tapered and decreases in size from the top opening to the bottom opening.

27. The swivelling snaphook of claim 17, wherein said resiliently deformable projection segment includes a flattened portion and a peak projection portion.

28. The swivelling snaphook of claim 17, wherein said projection segment is arranged in a generally helical configuration on said internal wall.

29. The swivelling snaphook of claim 17, wherein said internal wall comprises three resiliently deformable projection segments.

30. The swivelling snaphook of claim 29, wherein each said projection segment includes a flattened portion and a peak projection portion, wherein the orifice includes a central axis therethrough extending along the geometric center of said orifice, and wherein the distance between the peak portion and the central axis of the orifice is less than the distance between the flattened portion and the central axis, said projection segments each being arranged adjacent another segment such that the peak portion of one segment is proximate the flattened portion of an adjacent segment.

31. A method of making a swivelling snaphook, comprising the steps of:

forming a retainer comprising a receptacle, a base bar with opposing ends, and two converging bars having opposite ends with one of said opposite ends of each converging bar joined to said receptacle and the other of said opposite ends joined to a different one of said opposing ends of said base bar, said receptacle including an internal wall defining an orifice, said internal wall comprising at least one resiliently deformable projection segment extending into said orifice;

forming a hook member comprising a hook body and an insertion member for engaging said receptacle in said retainer, said insertion member includes a neck and an enlarged end portion; and pressing said insertion member of said hook member into said orifice of said receptacle such that said enlarged end portion engages and resiliently deforms said at least one projection segment to enlarge said orifice to enable passage of said enlarged end portion through said orifice such that said neck is rotatably mounted in said orifice and said enlarged end portion is engageable by said at least one projection segment to inhibit separation of said insertion member and said receptacle.

32. The method of claim 31, wherein said step of pressing said insertion member into said receptacle comprises pressing said insertion member to cause said converging bars to flex toward said base bar for applying an upward force against said hook member to securely lock the insertion member in said receptacle.

33. The method of claim 31, wherein said step of pressing said insertion member into said orifice comprises resiliently deforming said projection segment to enlarge said orifice to enable passage of said enlarged end portion of said insertion member through said orifice thereby enabling said projection segments to return to a generally unstressed state.

* * * * *